United States Patent [19]

Gippa

[11] Patent Number: 4,523,359
[45] Date of Patent: Jun. 18, 1985

[54] MACHINE WITH AN INTERMITTENTLY ROTATING TABLE FOR THE PREFORMANCE OF WORK OPERATIONS

[75] Inventor: Michelangelo Gippa, Chiasso, Switzerland

[73] Assignee: Azypatent AG, Vaduz, Liechtenstein

[21] Appl. No.: 454,081

[22] Filed: Dec. 28, 1982

[30] Foreign Application Priority Data

Dec. 28, 1981 [CH] Switzerland ............... 8302/81
Dec. 29, 1981 [CH] Switzerland ............... 8319/81

[51] Int. Cl.³ .................. B23B 9/12; B23B 13/04
[52] U.S. Cl. .................................. 29/38 A; 29/41; 29/43; 29/45; 82/2 D; 409/173
[58] Field of Search ............ 29/38 A, 38 C, 38 D, 29/41, 42, 43, 44, 45; 82/2 D; 408/45, 73; 409/173

[56] References Cited

U.S. PATENT DOCUMENTS

| | | | |
|---|---|---|---|
| 1,907,550 | 5/1933 | Knowles | 29/38 C |
| 2,272,055 | 2/1942 | Carlson | 29/38 D |
| 3,689,965 | 9/1972 | Bertoglio | 29/38 C |
| 3,797,081 | 3/1974 | Buzzi | 29/38 C |

OTHER PUBLICATIONS

N. P. Chironis, "Mechanisms, Linkages, and Mechanical Controls", McGraw-Hill 1965 p. 71.

Primary Examiner—Z. R. Bilinsky
Attorney, Agent, or Firm—Young & Thompson

[57] ABSTRACT

A machine has an intermittently rotating table for holding parts to be worked on or assembled. Operating units (20, 21, 25) are actuable either simultaneously for all units or groups of units, or independently of one another. The operating units can be mounted vertically over or under the table and also laterally and can receive the rotary movement of a central wheel or independent motors. According to a preferred embodiment, the control of the feed is effected by the central shaft (4). During a work cycle, this shaft makes a vertical movement and transmits that movement to the operating units (20, 21) by radial linear cams (16, 17, etc.), i.e., feed and return occur during a single movement of the shaft (4), for example, downward. During idle time, i.e., the time used to move and index the table (8) but not to perform the work, the central shaft (4) is also turned through a certain angle so that the linear cams are no longer in contact with the operating units and in this position the central shaft is returned without influencing the operating units. Thus it is possible to give the operating units any feed and return characteristic of machines with rotary cams, while having very much simplified kinematics.

4 Claims, 7 Drawing Figures

MACHINE WITH AN INTERMITTENTLY ROTATING TABLE FOR THE PREFORMANCE OF WORK OPERATIONS

This invention relates to a machine with an intermittently rotating table for working and assembly of high-precision parts along three axes.

Machines with an intermittently rotating table for working and mounting of high-precision parts, such as electrical contacts, small metal parts, points of ballpoint pens, etc., are known.

They make possible simultaneous automatic working along two axes, for example, in the case of a point of a ballpoint pen, the downward drilling of an axial hole of a determined diameter and the simultaneous upward working of the lower point along the same axis.

The machine according to the present invention differs from known ones by the fact that it makes it possible to give to the operating units the same feed and return characteristics as occur in machines with rotary cams, while having very simplified kinematics and working along three different axes.

Furthermore, since the controls are in the center of the machine, it offers complete accessibility to the tools and the parts to be worked.

The machine according to this invention comprises working units placed above, below and laterally with respect to the rotary table with intermittent movement. Control of the feed of the units to be worked is effected by a central shaft that is coaxial with the rotary table.

The accompanying drawings represent two preferred nonlimiting embodiments of the machine in question that allow working and assembly of small parts along three axes.

Figure 1:
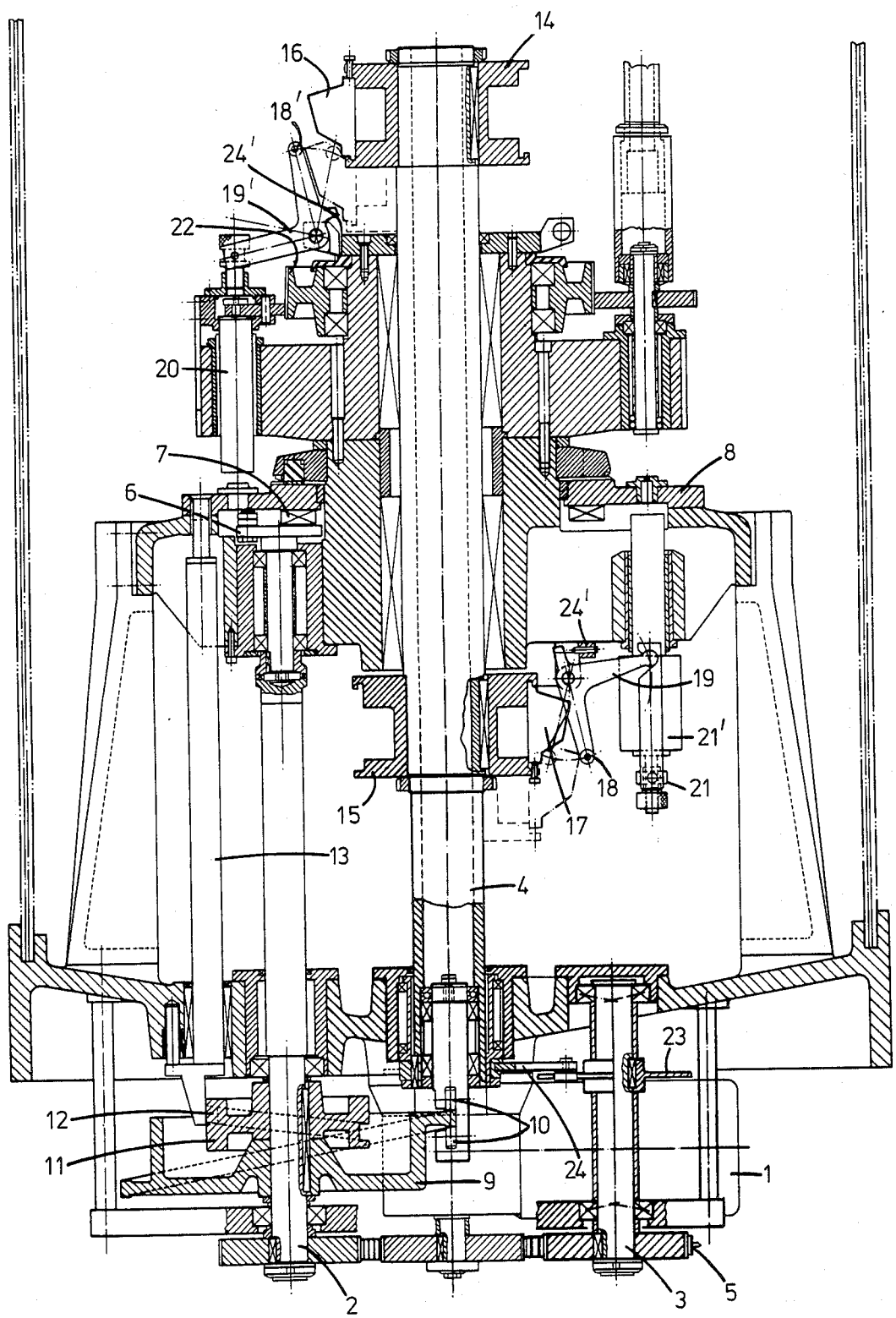
FIG. 1 is an axial sectional view of the machine according to a first embodiment, in which the various work units are controlled simultaneously.
Figure 2:
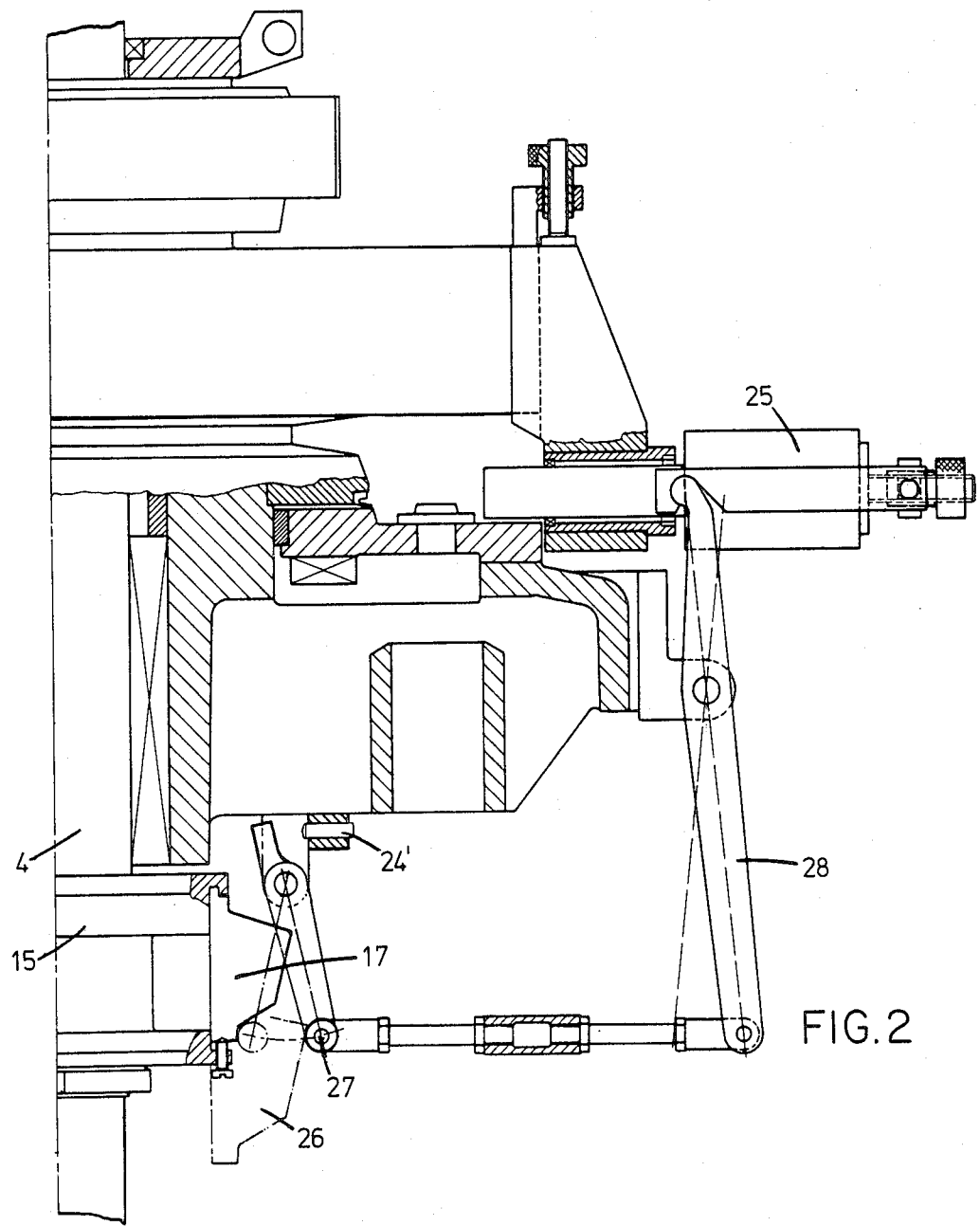
FIG. 2 is an axial sectional view of a lateral station of the machine of FIG. 1.
Figure 3:
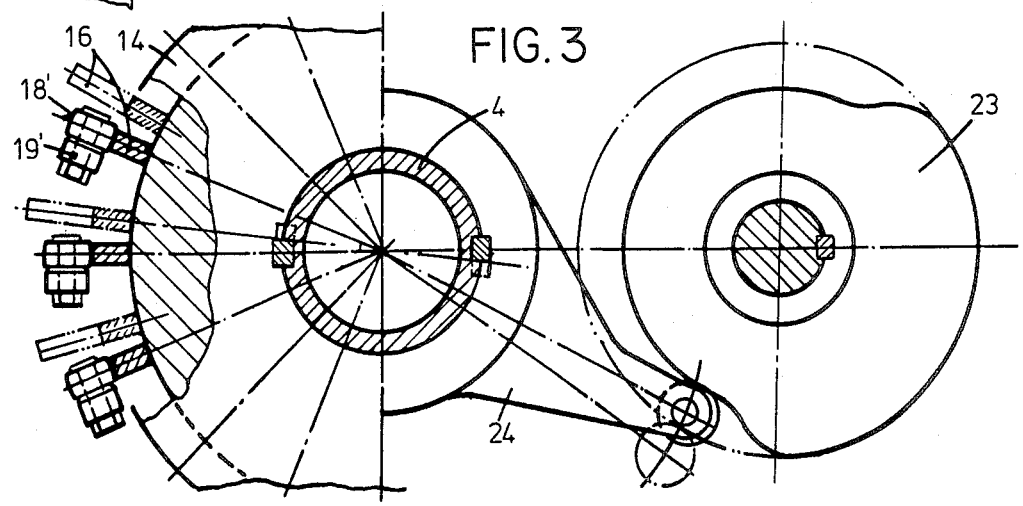
FIG. 3 is an enlarged fragmentary plan view showing some details on an enlarged scale.

With reference to FIGS. 1, 2 and 3, the drive movement is supplied by motor 1 (FIG. 1) which transmits it to auxiliary shafts 2 and 3 parallel to central shaft 4, by a motion reducer and toothed belt 5.

Auxiliary shaft 2 controls Geneva movement 6, 7, which changes the continuous rotary movement into an intermittent rotary movement for driving table 8.

To the base of auxiliary shaft 2 is fastened drum cam 9 which, by acting on rollers 10, causes the axial movement of central shaft 4. Also to auxiliary shaft 2 is fastened another drum cam 11 that controls indexing of table 8 by rollers 12 and rod 13.

To spaced locations on central shaft 4 are fastened cylindrical bodies 14 and 15 on which are secured radial linear cams 16, 17 (see also FIG. 3). These cams, by rollers 18, 18' and levers 19, 19', control the movement of operating units 20, 21.

The operating units at the work stations can be rotated about their respective vertical axes by a central gear wheel 22 or independent small motors 21'.

In operation, central shaft 4 makes a downward movement and in this phase cams 16, 17 are in contact with rollers 18, 18' of levers 19, 19' which control the movement of operating units 20, 21.

At the end of this period operating units 20, 21 are in their starting positions. Specifically, the rollers 18, 18' ride along the profiles of cams 16, 17, starting from the lower ends of those profiles. At the radially outermost portion of the profile, the operating unit will be closest to the workpiece. But thereafter the cam continues its downward movement; and the roller rolls radially inwardly, rapidly, along the steeply inclined uppermost part of the cam profile, under the influence of springs (not shown) that urge the operating units toward their retracted positions. At the end of its downward movement, the cam is spaced a short distance from the roller, because the lever now rests against a step 24'.

At this point, simultaneously with the rotation of table 8, central shaft 4 is turned through a certain angle by cam 23 fastened to auxiliary shaft 3, and lever 24. At this moment, linear cams 16, 17 are no longer in contact with rollers 18, 18' as explained above, and therefore no longer control the operating units 20, 21 and upward return of central shaft 4 occurs without influencing the operating units themselves. When upward return has occurred, central shaft 4 is rotated back to its starting position. The return and rotation of central shaft 4 occur during idle times, i.e., during the rotation and indexing of table 8. During rotation and return of central shaft 4, levers 19, 19' rest on stops 24'.

FIG. 2 shows on a larger scale an axial section of the control members of a lateral station 25.

Operating unit 25 receives its feed control from linear cam 26 by roller 27 and lever arrangement 28.

FIG. 3 shows, for greater clarity, in plan view, in the right half of the figure, elements 23, 24 located in the lower part of the machine that control central shaft 4, and in the left half of the figure, elements 16, 18', 19' located in the upper part of the machine itself itslef and which control the axial movements of operating units 20.

Figure 4:
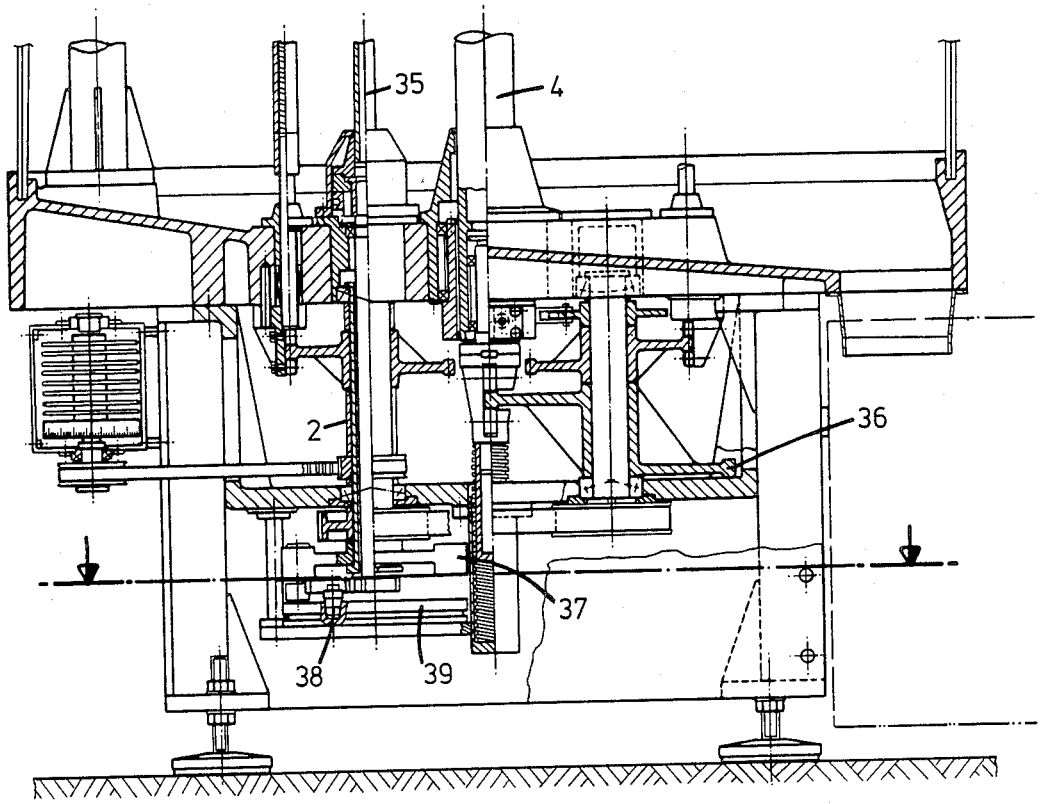
FIGS. 4 and 5 show a particular embodiment of the Geneva movement that controls the intermittent movement of the part-carrying table.
Figure 5:
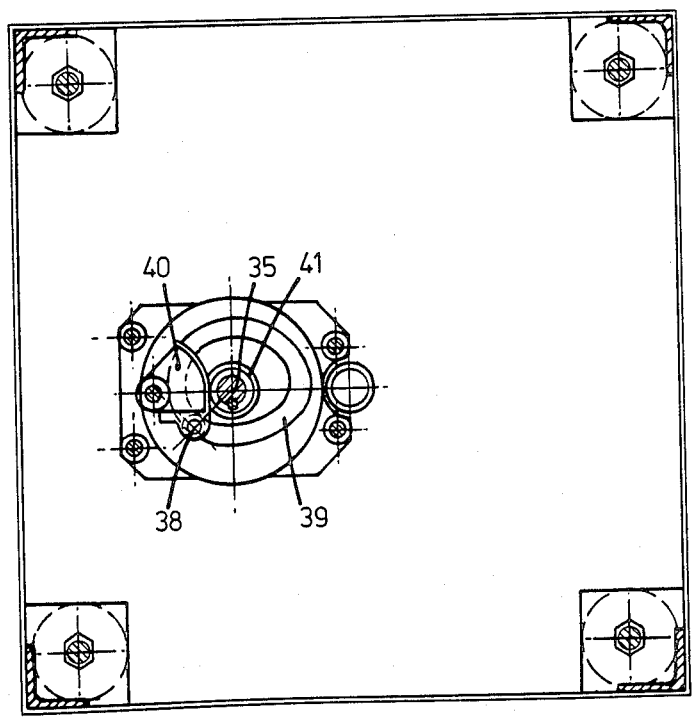

FIGS. 4 and 5 show a particular embodiment of the Geneva movement, which, as is known, is a very simple mechanism for generating an intermittent movement from a continuous rotary movement. Its disadvantage, however, is that the law of translation is fixed, i.e., it depends only on its angular subdivision. The mechanism described here makes it possible to eliminate this drawback and to reduce the angle of rotation necessary for indexing and also to modify the characteristics of the movement itself.

The operation is as follows: the continuous rotary movement of shaft 2 is transmitted from body 37 by toothed segment 40 and cogwheel 41 to shaft 35 coaxial with shaft 2.

Toothed segment 40 carries roller 38 that in turn is guided by cam 39. Cam 39 has such a geometry that during translation of the table it accelerates toothed segment 40, thus superposing a relative rotary movement on cogwheel 41 and therefore on shaft 35 which controls the Geneva movement.

Thus, it is possible to reduce the angle necessary for translation of the rotary table and the law of translation can also be corrected to obtain a constant acceleration, for example.

Figure 6:
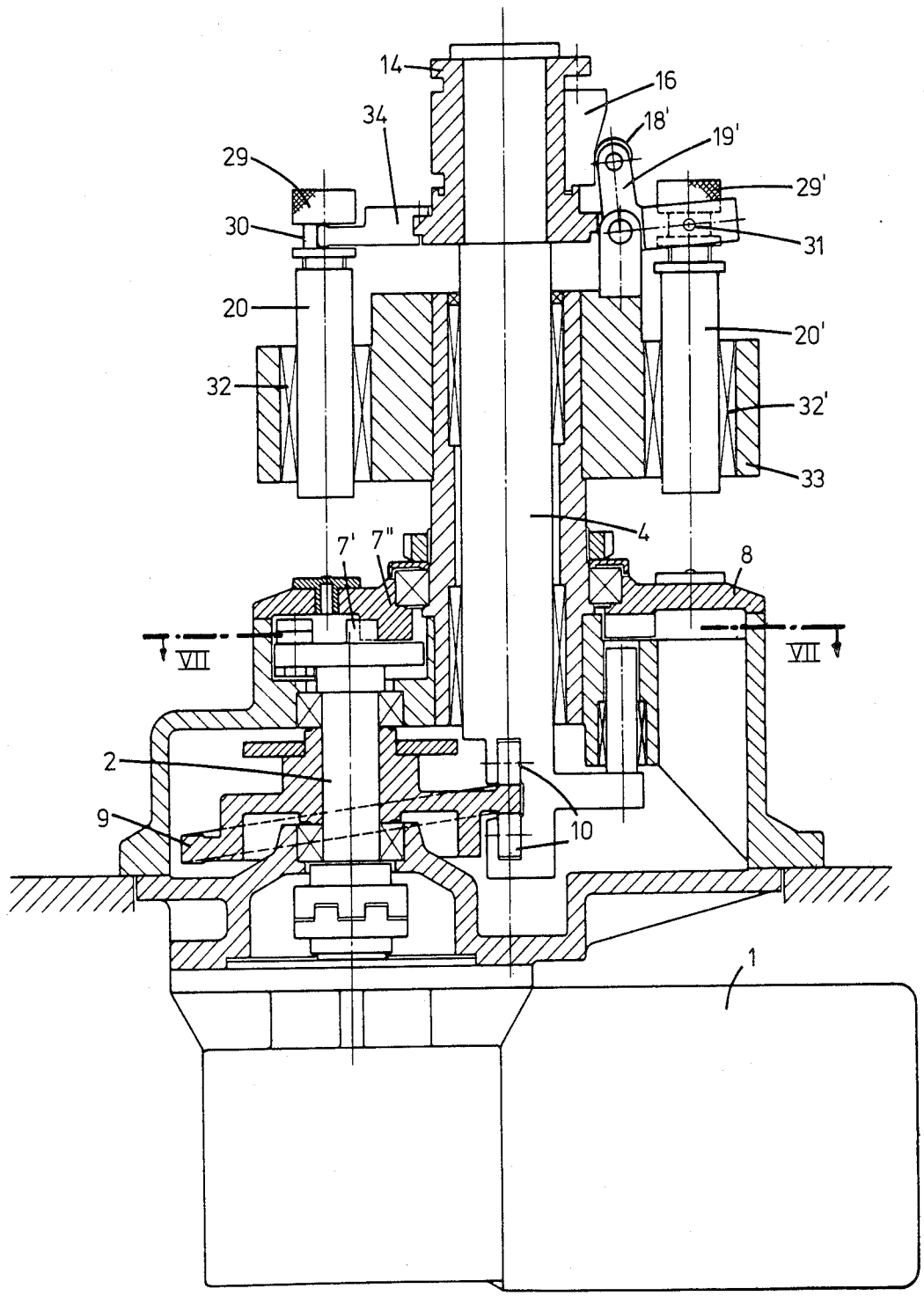
FIG. 6 shows in axial section a second embodiment of the machine in question in which the various work units are controlled independently of one another.
Figure 7:
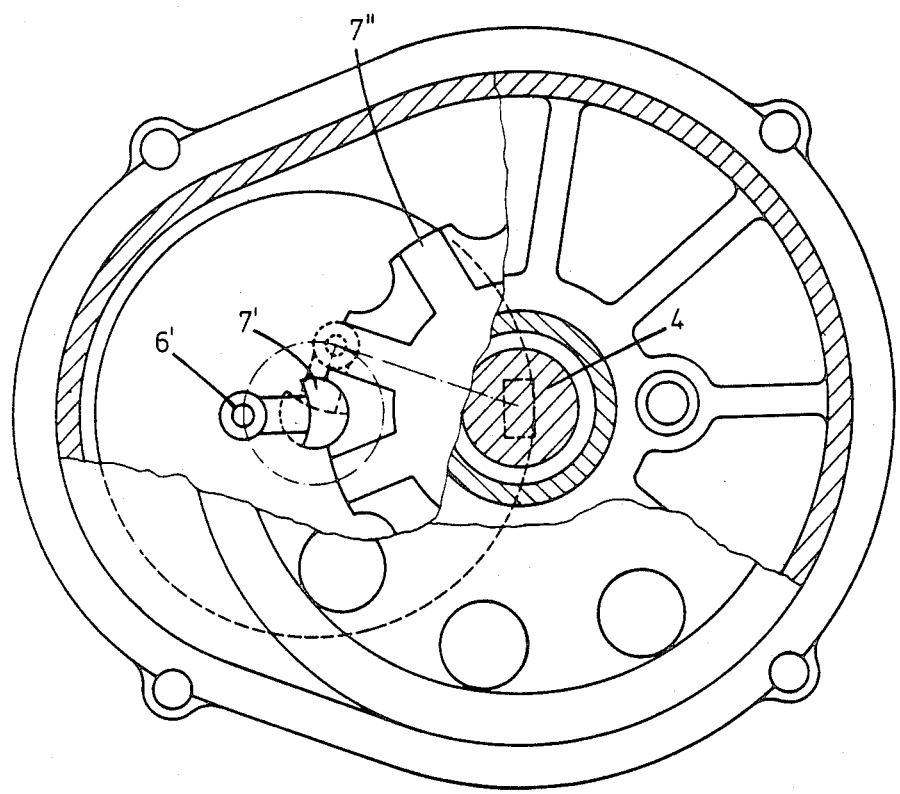
FIG. 7 is a cross section of FIG. 6 on the line VII—VII in FIG. 6.

FIGS. 6, 7 represent a simpler variant of the machine in question especially suited to mounting and working of small parts that require only vertically operating units.

In this version as well, the basic principle of the use of central shaft 4 for control of operating units 20, 20' remains the same.

For simplification, the central shaft does not rotate; it undergoes only an oscillating movement.

The machine of FIGS. 6 and 7 comprises: first elements 9, 10 adapted to impart the required axial movement to central shaft 4, second elements 34, 29, 14, 30, 32 connecting each operating unit 20, 20' to said central shaft to control the feed of each unit directly, using the axial movement of said central shaft, and third elements 19', 31 connecting each operating unit to said central shaft, by intermediate elements 16, 18', to control the feed of each operating unit 20, 20' indirectly, independently of the others, while still using the axial movement of said central shaft 4.

In a more detailed manner and with reference to FIG. 6, the machine comprises a central shaft 4 controlling the feed of the work units.

Rotary driving movement is still supplied by motor 1 which transmits it to auxiliary shaft 2 parallel to central shaft 4 by the speed reducer.

Shaft 2 controls Geneva mechanism 6', 7', 7", (also see FIG. 7) which transforms the continuous rotary movement into an intermittent movement to drive rotary table 8 stepwise.

At the top of central shaft 4 is fastened bushing 14, which, by lever 34, engages in groove 30 of micrometrically adjustable support 29, 29' of the corresponding operating unit 20, 20'. Thus, this makes it possible to operate it, i.e., to make the operating unit travel axially upward and downward along support 33 by the bearing elements generally indicated by 32, 32' and preferably consisting of a ball cage.

In this way, each operating unit 20, 20' is directly vertically driven by central shaft 4.

Another group of elements comprises, for each work unit, a linear cam 16 secured to bushing 14; roller 18', located at the end of crank 19', travels on this cam; the other end of the lever is connected to support 29' carrying the corresponding operating unit 20'. As before, springs (not shown) urge working unit 20' toward retracted position, thereby to maintain roller 18' in contact with cam 16.

In this way, for any position, operating units 20, 20', etc. have two feed possibilities:

The first with direct connection to central shaft 4, by lever 34;

The second, with indirect connection by linear cam 16, roller 18' and crank 19'.

In both cases operating units 20, 20' are always under the control of central shaft 4 and therefore the work and return movement of the units themselves is identical.

After each operation, central shaft 4 is quickly brought back to its initial raised position before executing the translation of rotary table 8. It is necessary to bring operating units 20, 20' back to the initial position, so as to avoid contact with the parts to be worked.

What is claimed is:

1. A machine for performing work operations on workpieces, comprising a work table for supporting said workpieces, said table being rotatable about a vertical axis, means for intermittently rotating said table about said vertical axis, a plurality of operating units disposed peripherally about the table and mounted for movement toward and away from workpieces carried by the table, a central shaft lying on the axis of rotation of the work table and movable both axially and rotatably relative to the work table, means responsive to axial movement of the shaft to move said operating units toward workpieces on the table, said responsive means comprising cams carried by the shaft and engageable with cam followers whose movement moves the operating units, indexing means engageable with the table to fix the rotated position of the table so that when the table is stationary, the workpieces will be in registration with the operating units, means for engaging said indexing means with and disengaging said indexing means from the work table whereby the work table undergoes its rotary movement when said indexing means are disengaged, and means to rotate the shaft when the indexing means are disengaged thereby to permit return axial movement of said shaft in the rotated position thereof with said cams out of contact with said cam followers.

2. A machine as claimed in claim 1, and a central wheel coaxial with said shaft for simultaneously imparting rotary movement to said operating units.

3. A machine as claimed in claim 1, and a motor that rotates two auxiliary shafts parallel to the central shaft, one of said auxiliary shafts driving means that transforms continuous rotary movement of said one auxiliary shaft into intermittent movement of the rotary table, said one auxiliary shaft having thereon a cam that engages with the central shaft to move the central shaft axially, said one auxiliary shaft having another cam that reciprocates an indexing rod that engages in apertures in the rotary table to index the rotary table.

4. A machine as claimed in claim 1, said rotation of said shaft being effected by a power-driven rotary cam that contacts a cam follower secured to the shaft, first to rotate the shaft in one direction to disalign the first-mentioned cams from the first-mentioned cam followers, and then, after axial return movement of the shaft, to rotate the shaft back in the direction opposite to the previous direction of rotation of the shaft.

* * * * *